United States Patent
Beyer et al.

(10) Patent No.: US 9,934,304 B2
(45) Date of Patent: Apr. 3, 2018

(54) SYSTEMS AND METHODS FOR MEMORY OPTIMIZATION INTEREST-DRIVEN BUSINESS INTELLIGENCE SYSTEMS

(71) Applicant: Workday, Inc., Pleasanton, CA (US)

(72) Inventors: Kevin Beyer, San Francisco, CA (US); Mayank Pradhan, San Jose, CA (US); Vignesh Sukumar, San Mateo, CA (US)

(73) Assignee: Workday, Inc., Pleasanton, CA (US)

( * ) Notice: Subject to any disclaimer, the term of this patent is extended or adjusted under 35 U.S.C. 154(b) by 298 days.

(21) Appl. No.: 14/828,836

(22) Filed: Aug. 18, 2015

(65) Prior Publication Data
US 2017/0053010 A1  Feb. 23, 2017

(51) Int. Cl.
G06F 17/00 (2006.01)
G06F 17/30 (2006.01)

(52) U.S. Cl.
CPC .. G06F 17/30592 (2013.01); G06F 17/30563 (2013.01)

(58) Field of Classification Search
None
See application file for complete search history.

(56) References Cited

U.S. PATENT DOCUMENTS

| | | | |
|---|---|---|---|
| 6,112,197 A | 8/2000 | Chatterjee et al. | |
| 6,161,105 A * | 12/2000 | Keighan | G06F 17/30259 |
| 6,349,138 B1 | 2/2002 | Doshi et al. | |
| 7,151,438 B1 | 12/2006 | Hall et al. | |
| 7,168,953 B1 | 1/2007 | Poggio et al. | |

(Continued)

FOREIGN PATENT DOCUMENTS

| | | |
|---|---|---|
| EP | 2040180 A1 | 3/2009 |
| WO | 2007072501 A2 | 6/2007 |

(Continued)

OTHER PUBLICATIONS

Extended European Search Report for European Application EP13754225.4, Report Completed May 4, 2015, dated May 13, 2015, 4 Pgs.

(Continued)

*Primary Examiner* — Hung Le
(74) *Attorney, Agent, or Firm* — Van Pelt, Yi & James LLP

(57) ABSTRACT

Systems and methods for optimizing memory in an interest-driven business intelligence system in accordance with embodiments of the invention are illustrated. A dictionary for storing values of a dataset may be partitioned in accordance with some embodiments. The partitions of the dictionary may be generated by mapping and reducer processes. The mapping processes receive a value, determine the dimension of the data to which the value belongs, and provides the value to a reducer process that handles the determined dimension. Each reducer process generates partitions of the dictionary for each dimension. The number of values in each partition is determined and compared to a threshold value. Partitions that have a number of values greater than the threshold are stored in a common memory. Partitions smaller than the threshold value can be combined with other partitions such that the cardinality of the combined partition exceeds the threshold value.

21 Claims, 7 Drawing Sheets

(56) References Cited

U.S. PATENT DOCUMENTS

| | | | |
|---|---|---|---|
| 7,209,923 B1 | 4/2007 | Cooper | |
| 7,272,660 B1 | 9/2007 | Powers et al. | |
| 7,275,053 B1 | 9/2007 | Gardner et al. | |
| 7,277,892 B2* | 10/2007 | Yanase | B82Y 10/00 |
| 7,293,031 B1 | 11/2007 | Dusker et al. | |
| 7,315,849 B2 | 1/2008 | Bakalash et al. | |
| 7,430,562 B1 | 9/2008 | Bedell et al. | |
| 7,680,761 B2* | 3/2010 | Zait | G06F 17/30312 |
| | | | 382/201 |
| 7,702,615 B1 | 4/2010 | Delurgio et al. | |
| 7,945,852 B1 | 5/2011 | Pilskalns et al. | |
| 8,032,485 B2 | 10/2011 | Alvarez et al. | |
| 8,055,609 B2* | 11/2011 | Chen | G06F 17/30592 |
| | | | 707/600 |
| 8,156,101 B2 | 4/2012 | Indeck et al. | |
| 8,260,840 B1 | 9/2012 | Sirota et al. | |
| 8,261,193 B1 | 9/2012 | Alur et al. | |
| 8,266,148 B2 | 9/2012 | Guha et al. | |
| 8,311,875 B1* | 11/2012 | Lloyd | G06Q 30/0241 |
| | | | 705/7.29 |
| 8,442,988 B2* | 5/2013 | Draese | G06F 17/30592 |
| | | | 382/239 |
| 8,447,721 B2 | 5/2013 | Eshleman et al. | |
| 8,671,091 B2* | 3/2014 | Cherniack | G06F 17/30457 |
| | | | 707/606 |
| 9,298,787 B2* | 3/2016 | Bhide | G06F 17/30563 |
| 9,323,815 B2* | 4/2016 | Bhide | G06F 17/30563 |
| 2003/0030733 A1 | 2/2003 | Seaman et al. | |
| 2004/0059701 A1 | 3/2004 | Fedorov | |
| 2004/0164961 A1 | 8/2004 | Bal et al. | |
| 2004/0167922 A1* | 8/2004 | Yanase | B82Y 10/00 |
| 2005/0038784 A1* | 2/2005 | Zait | G06F 17/30312 |
| 2005/0187974 A1 | 8/2005 | Gong et al. | |
| 2007/0021992 A1 | 1/2007 | Konakalla et al. | |
| 2007/0078960 A1 | 4/2007 | Dawson et al. | |
| 2007/0136683 A1 | 6/2007 | Heidari et al. | |
| 2007/0156718 A1 | 7/2007 | Hossfeld et al. | |
| 2008/0033914 A1* | 2/2008 | Cherniack | G06F 17/30457 |
| 2008/0109235 A1 | 5/2008 | Binnie et al. | |
| 2008/0294996 A1 | 11/2008 | Hunt | |
| 2008/0313345 A1 | 12/2008 | Bernardin et al. | |
| 2009/0187582 A1* | 7/2009 | Chen | G06F 17/30592 |
| 2009/0248631 A1 | 10/2009 | Alba et al. | |
| 2009/0254521 A1* | 10/2009 | Raman | H03M 7/40 |
| 2010/0100952 A1 | 4/2010 | Sample et al. | |
| 2010/0251100 A1 | 9/2010 | Delacourt | |
| 2010/0287146 A1 | 11/2010 | Skelton et al. | |
| 2011/0004830 A1 | 1/2011 | Von Kaenel et al. | |
| 2011/0137850 A1 | 6/2011 | Mourey et al. | |
| 2011/0145287 A1 | 6/2011 | Jiang et al. | |
| 2011/0208692 A1* | 8/2011 | Satpathy | G06F 17/30592 |
| | | | 707/606 |
| 2011/0282690 A1 | 11/2011 | Patel et al. | |
| 2011/0313969 A1 | 12/2011 | Ramu | |
| 2012/0117064 A1* | 5/2012 | Draese | G06F 17/30592 |
| | | | 707/737 |
| 2012/0130987 A1 | 5/2012 | Bose et al. | |
| 2012/0169713 A1 | 7/2012 | Gao et al. | |
| 2012/0179742 A1 | 7/2012 | Acharya et al. | |
| 2013/0013552 A1 | 1/2013 | Eshleman et al. | |
| 2013/0018671 A1 | 1/2013 | Hussam et al. | |
| 2013/0086104 A1 | 4/2013 | Morrison et al. | |
| 2013/0103677 A1 | 4/2013 | Chakra et al. | |
| 2013/0117216 A1* | 5/2013 | Bhide | G06F 17/30563 |
| | | | 707/602 |
| 2013/0117217 A1* | 5/2013 | Bhide | G06F 17/30563 |
| | | | 707/602 |
| 2013/0136416 A1 | 5/2013 | Sathish et al. | |
| 2013/0226860 A1 | 8/2013 | Eshleman et al. | |
| 2013/0238551 A1 | 9/2013 | Eshleman et al. | |
| 2014/0114909 A1 | 4/2014 | Schuster et al. | |
| 2014/0114970 A1 | 4/2014 | Prabu et al. | |
| 2014/0258209 A1 | 9/2014 | Eshleman et al. | |
| 2015/0081353 A1 | 3/2015 | Schuster et al. | |
| 2015/0081618 A1 | 3/2015 | Schuster et al. | |
| 2015/0081619 A1 | 3/2015 | Brown et al. | |
| 2015/0112969 A1 | 4/2015 | Prabhu et al. | |
| 2015/0319230 A1* | 11/2015 | Skjolsvold | H04L 67/101 |
| | | | 709/224 |
| 2016/0283863 A1* | 9/2016 | Bowers | G06N 99/005 |

FOREIGN PATENT DOCUMENTS

| | | |
|---|---|---|
| WO | 2008092149 A2 | 7/2008 |
| WO | 2013130870 A1 | 9/2013 |
| WO | 2014066051 A3 | 5/2014 |
| WO | 2014066052 A3 | 7/2014 |
| WO | 2014137413 A1 | 9/2014 |
| WO | 2015041714 A1 | 3/2015 |
| WO | 2015041731 A1 | 3/2015 |
| WO | 2015041735 A1 | 3/2015 |
| WO | 2015060892 A1 | 4/2015 |
| WO | 2015060893 A1 | 4/2015 |

OTHER PUBLICATIONS

International Preliminary Report on Patentability for International Application PCT/US2013/064271, Report Issued Apr. 28, 2015, dated May 7, 2015, 9 Pgs.

International Preliminary Report on Patentability for International Application PCT/US2013/064272, Report Issued Apr. 28, 2015, dated May 7, 2015, 5 Pgs.

International Preliminary Report on Patentability for International Application PCT/US2013/067815, Report Issued Sep. 8,2015, dated Sep. 17, 2015, 9 Pgs.

International Search Report and Written Opinion for International Application PCT/US2013/028402, completed Apr. 22, 2013, 7 pgs.

International Search Report and Written Opinion for International Application PCT/US14/22060, report completed Jun. 23, 2014 dated Jul. 21, 2014, 9 Pgs.

International Search Report and Written Opinion for International Application PCT/US13/64271, report completed Mar. 26, 2014, dated Apr. 18, 2014, 10 Pgs.

International Search Report and Written Opinion for International Application PCT/US13/64272, report completed Mar. 28, 2014, dated Apr. 21, 2014, 6 Pgs.

International Search Report and Written Opinion for International Application PCT/US14/29149, report completed Jul. 22, 2014, dated Aug 25, 2014, 9 Pages.

International Search Report and Written Opinion for International Application PCT/US14/29191, report completed Jun. 30, 2014, dated Aug 15, 2014, 9 Pages.

International Search Report and Written Opinion for International Application PCT/US2013/067815, completed Apr. 14, 2014, 11 pgs.

International Search Report and Written Opinion for International Application PCT/US2014/027875, report completed Jul. 15, 2014, dated Aug 19, 2014, 9 Pages.

International Search Report and Written Opinion for International Application PCT/US14/44050, report completed Oct 3, 2014, dated Oct 15, 2014, 7 Pgs., Oct. 15, 2014.

International Search Report and Written Opinion for International Application PCT/US14/42488, report completed Sep 25, 2014, dated Oct 30, 2014, 9 Pgs., Oct. 30, 2014.

International Preliminary Report on Patentability for International Application PCT/US2013/028402, report completed Apr. 23, 2013, dated Sep 12, 2014, 6 Pgs., Sep. 12, 2014.

Borthakur, Dhruba et al., "Apache Hadoop Goes Realtime at Facebook", SIGMOD '11 Proceedings of the 2011 ACM SIGMOD International Conference on Management of data, 1071-1080.

Cohen, Jeffrey et al., "MAD Skills: New Analysis Practices for Big Data", Proceedings of the VLDB Endowment, vol. 2 Issue 2, Aug. 2009, 1481-1492.

Condie, Tyson et al., "MapReduce Online", Available online at http://www.eecs.berkeley.edu/Pubs/TechRpts/2009/EECS-2009-136.html, 1-15.

Karabegovic, Almir et al., "Geoportal as Decision Support System with Spatial Data Warehouse", [online] published 2012. [retrieved

(56) References Cited

OTHER PUBLICATIONS on Oct. 3, 2014 (Oct. 3, 2014)] Retrieved from the Internet<URL: https://fedcsis.org/proceedings/2012/pliks/111.pdf> entire document, 2012, 4 Pages.

Kossmann, Donald , "The State of the Art in Distributed Query Processing", ACM Computing Surveys, vol. 32 Issue 4, Dec. 2000, Dec. 2000, 422-469.

Metwally, Ahmed et al., "Efficient Computation of Frequent and Top-k Elements in Data Streams", Department of Computer Science, University of California, Santa Barbara, 21 pgs.

Morfonios, Konstantinos et al., "ROLAP Implementations of the Data Cube", ACM Computing Surveys, vol. 39, No. 4, Article 12, 2007, Oct. 2007, 12:1-12:53.

Nandi, Arnab et al., "Guided Interaction: Rethinking the Query-Result Paradigm", Proceedings of the VLDB Endowment, vol. 4, No. 12, Aug. 2011, 1466-1469.

Shvachko, Konstantin et al., "The Hadoop Distributed File System", 2010 IEEE 26th Symposium on Mass Storage Systems and Technologies (MSST), 1-10.

International Preliminary Report on Patentability for International Application PCT/US2014/029149, Report issued Apr. 26, 2016, dated May 6, 2016, 9 Pgs.

International Preliminary Report on Patentability for International Application PCT/US2014/022060, Report issued Mar. 22, 2016, dated Mar. 31, 2016, 8 Pgs.

International Preliminary Report on Patentability for International Application PCT/US2014/029191, Report issued Apr. 26, 2016, dated May 6, 2016, 9 Pgs.

International Preliminary Report on Patentability for International Application PCT/US2014/042488, Report issued Mar. 22, 2016, dated Mar. 31, 2016, 8 Pgs.

International Preliminary Report on Patentability for International Application PCT/US2014/044050, Report issued Mar. 22, 2016, dated Mar. 31, 2016, 6 Pgs.

* cited by examiner

SYSTEMS AND METHODS FOR MEMORY OPTIMIZATION INTEREST-DRIVEN BUSINESS INTELLIGENCE SYSTEMS

FIELD OF THE INVENTION

The present invention is generally related to business intelligence systems and more specifically to processing data in business intelligence systems.

BACKGROUND

The term "business intelligence" is commonly used to refer to techniques for identifying, processing, and analyzing business data. Business intelligence systems can provide historical, current, and predictive views of business operations. Business data, generated during the course of business operations, including data generated from business processes and the additional data created by employees and customers, may be structured, semi-structured, or unstructured depending on the context and knowledge surrounding the data. In many cases, data generated from business processes is structured, whereas data generated from customer interactions with the business is semi-structured or unstructured. Due to the amount of data generally generated during the course of business operations, business intelligence systems are commonly built on top of and/or utilize a data warehouse.

Data warehouses are utilized to store, analyze, and report data such as business data. Data warehouses utilize databases to store, analyze, and harness the data in a productive and cost-effective manner. A variety of databases are commonly utilized including a relational database management system (RDBMS), such as the Oracle Database from the Oracle Corporation of Santa Clara, Calif., or a massively parallel processing analytical database, such as Teradata from the Teradata Corporation of Miamisburg, Ohio. Business intelligence (BI) and analytical tools, such as SAS from SAS Institute, Inc. of Cary, N.C., are used to access the data stored in the database and provide an interface for developers to generate reports, manage and mine the stored data, perform statistical analysis, business planning, forecasting, and other business functions. Most reports created using BI tools are created by database administrators and/or business intelligence specialists, and the underlying database may be tuned for the expected access patterns. A database administrator may index, pre-aggregate or restrict access to specific relations, allow ad-hoc reporting and exploration.

A snowflake schema is an arrangement of tables in a RDBMS, with a central fact table connected to one or more dimension tables. The dimension tables in a snowflake schema are normalized into multiple related tables—for a complex schema there will be many relationships between the dimension tables, resulting in a schema that looks like a snowflake. A star schema is a specific form of a snowflake schema having a fact table referencing one or more dimension tables. However, in a star schema, the dimensions are normalized into a single table—the fact table is the center and the dimension tables are the "points" of the star.

Online transaction processing (OLTP) systems are designed to facilitate and manage transaction-based applications. OTLP may refer to a variety of transactions such a database management system transactions, business, or commercial transactions. OLTP systems typically have low latency response to user requests.

Online analytical processing (OLAP) is an approach to answering multidimensional analytical queries. OLAP tools enable users to analyze multidimensional data utilizing three basic analytical operations: consolidation (aggregating data), drill-down (navigating details of data), and slice and dice (take specific sets of data and view from multiple viewpoints). The basis for many OLAP systems is an OLAP cube. An OLAP cube is a data structure allowing for fast analysis of data with the capability of manipulating and analyzing data from multiple perspectives. OLAP cubes are typically composed of numeric facts, called measures, categorized by dimensions. These facts and measures are commonly created from a star schema or a snowflake schema of tables in a RDBMS.

SUMMARY OF THE INVENTION

Systems and methods for optimizing memory in an interest-driven business intelligence system in accordance with embodiments of the invention are illustrated. In one embodiments, an interest-driven business intelligence server system includes at least two processors and a memory storing an interest-driven business intelligence application wherein the interest-driven business intelligence application directs the at least two processors to receive raw data that has a plurality of dimensions, generate at least one partition of a dictionary for each of a set dimensions of the plurality of dimensions of the raw data wherein each at least one partition includes an entry for each of at least a portion of values in one of the plurality dimensions wherein an entry includes a dictionary identifier and a value, determine a number of entries in each of the at least one partitions generated, determine whether the number of entries in each of the at least one partitions is greater than a threshold value, store each of the at least one partitions that have a number of entries greater than the threshold value in a common memory, combine one or more of the at least one partitions having a number of entries less than the threshold value into a partition that includes a number of entries greater than the threshold values, and store each partitions formed from combining partitions in the common memory.

In an additional embodiment of the invention, each of the set of dimensions of the plurality of dimension is a column of the raw data.

In another embodiment of the invention, the interest-driven business intelligence application further directs the at least two processors to columnize the raw data.

In yet another additional embodiment of the invention, the interest-driven business intelligence application further directs the at least two processors to provide at least one mapping process and at least one reducer process, each of the at least one mapping processes receives a value from a particular one of the set of dimensions of the raw data and provides the value to one of a set of at least one of the at least one reducer processes that generate a partition of the dictionary for the particular one of the set of dimensions, and each of the at least one reducer processes generates a particular partition of the dictionary for each one of the set of dimensions for which a value is received by the at least one reducer.

In still another additional embodiment of the invention, the interest-driven business intelligence application further directs the at least two processors to replace a value in the raw data with a partition identifier and a dictionary identifier.

In yet still another additional embodiment of the invention, the interest-driven business intelligence application further directs the at least two processors to change the partition identifier of a value in response to combining one or more partitions.

In yet another embodiment of the invention, the interest-driven business intelligence application further directs the at least two processors to reconcile dictionary identifiers for values in combined partitions in response to combining two or more partitions.

In still another embodiment of the invention, the interest-driven business intelligence application further directs the at least two processors to receive a request to obtain a value, read position in data to obtain a partition identifier and dictionary identifier of the value, and obtain the value from a partition of the dictionary identified by the partition identifier using the dictionary identifier.

In yet still another embodiment of the invention, the obtaining of the value includes loading the partition identified by the partition identifier into a memory associated with one of the at least two processors.

In yet another additional embodiment of the invention, the interest-driven business intelligence application further directs the at least two processors to read column identifier from the position in the data and use to dictionary identifier and column identifier to obtain the value from the partition.

Still another embodiment of the invention includes a method for generating a partitioned dictionary for an interest-driven business intelligence system using an interest-driven business intelligence server system, the method including receiving raw data that has a plurality of dimensions in the business intelligence server system, generating at least one partition of a dictionary for each of a set dimensions of the plurality of dimensions of the raw data using the business intelligence server system wherein each at least one partition includes an entry for each of at least a portion of values in one of the plurality dimensions wherein an entry includes a dictionary identifier and a value, determining a number of entries in each of the at least one partitions generated using the business intelligence server system, determining whether the number of entries in each of the at least one partitions is greater than a threshold value using the business intelligence server system, storing each of the at least one partitions that have a number of entries greater than the threshold value in memory accessible by nodes in the business intelligence server system using the business intelligence server system, combining one or more of the at least one partitions having a number of entries less than the threshold value into a partition that includes a number of entries greater than the threshold values using the business intelligence server system, and storing each partitions formed from combining partitions in the common memory using the business intelligence server system.

In yet another additional embodiment of the invention, each of the set of dimensions of the plurality of dimension is a column of the raw data.

In still another additional embodiment of the invention, the method further includes columnizing the raw data using the business intelligence server system.

In yet still another additional embodiment of the invention, the method further includes providing at least one mapping process and at least one reducer process using the business intelligence server system, wherein each of the at least one mapping processes receives a value from a particular one of the set of dimensions of the raw data and provides the value to one of a set of at least one of the at least one reducer processes that generate a partition of the dictionary for the particular one of the set of dimensions and each of the at least one reducer processes generates a particular partition of the dictionary for each one of the set of dimensions for which a value is received by the at least one reducer.

In yet another embodiment of the invention, the method further includes replacing a value in the raw data with a partition identifier and a dictionary identifier using the business intelligence server system.

In still another embodiment of the invention, the method further includes changing the partition identifier of a value using the business intelligence server system in response to combining one or more partitions.

In yet still another embodiment of the invention, the method further includes reconciling dictionary identifiers for values in combined partitions using the business intelligence server system in response to combining two or more partitions.

In yet another additional embodiment of the invention, the method further includes receiving a request to obtain a value in a node of the business intelligence server system from an operation being performed by the node, reading a position in the data to obtain a partition identifier and dictionary identifier of the value using the node, and obtaining the value from a partition of the dictionary identified by the partition identifier based upon the dictionary identifier using the node.

In still another additional embodiment of the invention, obtaining of the value includes loading the partition identified by the partition identifier into a memory associated with a node of the business intelligence server system.

Yet another embodiment of the invention includes an interest-driven business intelligence server system including at least two processors and a memory connected to the at least two processors and storing an interest-driven business intelligence application wherein the interest-driven business intelligence application directs the at least two processors to receive a first dataset and a second dataset wherein the first and second datasets each include a key dimension that store a common type of value, determine frequently occurring values in the key dimension of the first dataset, read portions of data from the first dataset from the first dataset using a first set mapping processes including at least one mapping process, determine a value in the key dimension in each portion of data using a one of the mapping processes from the set of mapping processes, provide each portion of data from the first dataset that has a value in the key dimension that is a frequently occurring value to each one of a set of reducer processes and each portion of data in the first dataset that does not have a value in the key dimension that is a frequent value to a reducer process in the set of reducer processes assigned to handle portions of the first data set having the value in the key dimension of the portion, provide each portion of data from the second dataset that has a value in the key dimension to one of the reducer processes in the set of reducer processes in a round-robin manner and each portion of data in the second dataset not having a frequent value to a one of the set of reducer processes assigned to handle the value in the key dimension of the portion, and perform a desired operation using the set of reducer processes.

DETAILED DISCLOSURE OF THE INVENTION

Figure 1:
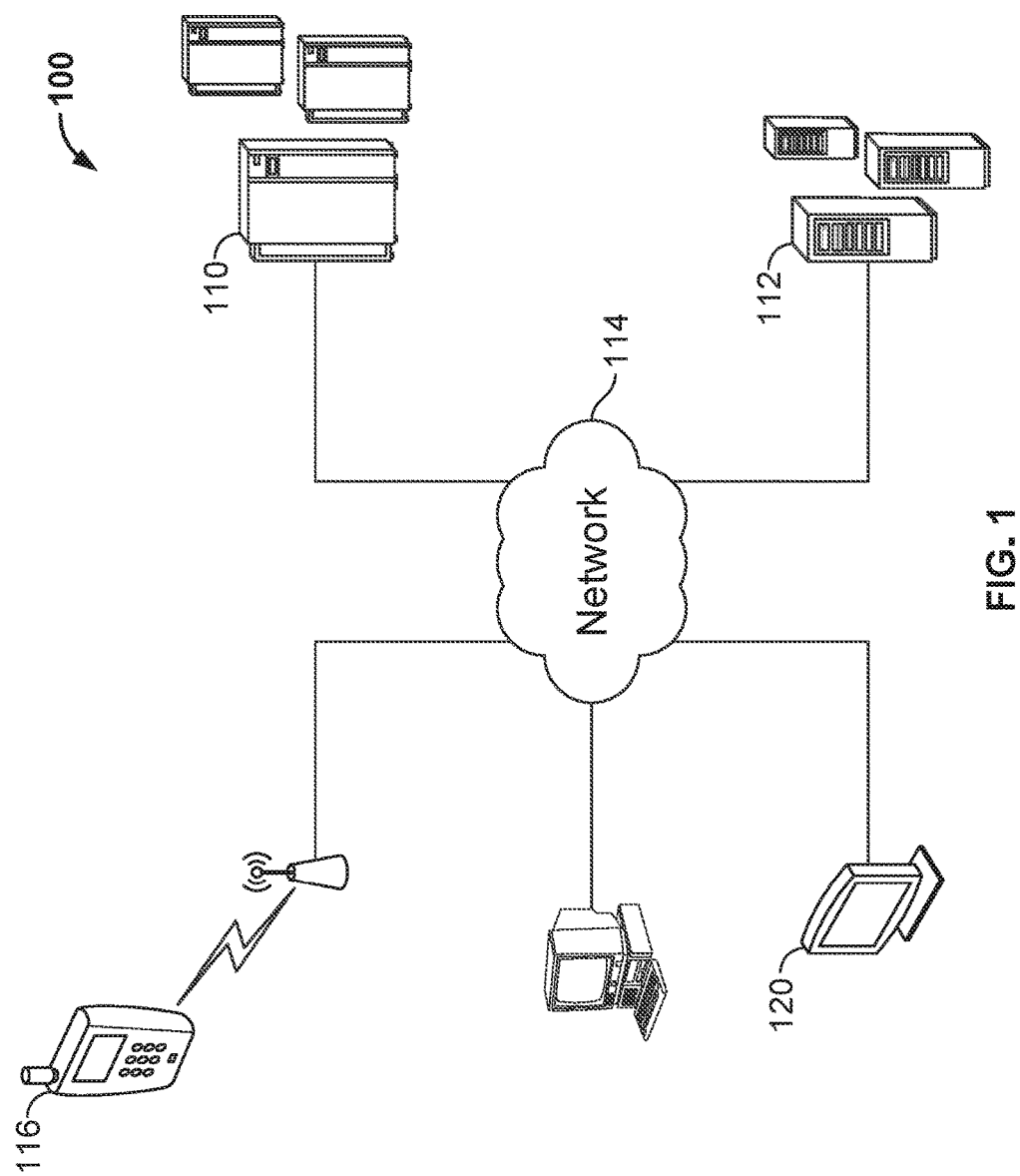
FIG. 1 is a network diagram of an interest-driven business intelligence system in accordance with an embodiment of the invention.

Turning now to the drawings, interest-driven business intelligence systems in accordance with embodiments of the invention are illustrated. Interest-driven business intelligence systems include interest-driven business intelligence server systems configured to create reporting data using raw data retrieved from distributed computing platforms. The interest-driven business intelligence server systems are configured to dynamically compile interest-driven data pipelines to provide analysts with information of interest from the distributed computing platform. The interest-driven business intelligence server system has the ability to dynamically reconfigure the interest-driven data pipeline to provide access to desired information stored in the distributed computing platform. An interest-driven data pipeline is dynamically compiled to create reporting data based on reporting data requirements determined by analysts within the interest-driven business intelligence system. Changes specified at the report level can be automatically compiled and traced backward by the interest-driven business intelligence server system to compile an appropriate interest-driven data pipeline to meet the new and/or updated reporting data requirements. Interest-driven business intelligence server systems further build metadata concerning the data available in the interest-driven business intelligence system and provide the metadata to interest-driven data visualization systems to enable the construction of reports using the metadata. In this way, interest-driven business intelligence server systems are capable of managing huge datasets in a way that provides analysts with complete visibility into the available data. Available data within an interest-driven business intelligence system includes, but is not limited to, raw data, aggregate data, filtered data, and reporting data. Interest-driven business intelligence systems and interest-driven business intelligence server systems that can be utilized in accordance with embodiments of the invention are discussed further in U.S. Pat. No. 8,447,721, titled "Interest-Driven Business Intelligence Systems and Methods of Data Analysis Using Interest-Driven Data Pipelines" and issued May 21, 2013, the entirety of which is incorporated herein by reference.

In many embodiments, the reports are created using interest-driven data visualization systems configured to request and receive data from an interest-driven business intelligence server system. Systems and methods for interest-driven data visualization that can be utilized in accordance with embodiments are described in U.S. Patent Publication No. 2014/0114970, titled "Systems and Methods for Interest-Driven Data Visualization Systems Utilized in Interest-Driven Business Intelligence Systems" and filed Mar. 8, 2013, the entirety of which is hereby incorporated by reference. In order for an interest-driven data visualization system to build reports, a set of reporting data requirements are defined. These requirements specify the reporting data (derived from raw data) that will be utilized to generate the reports. The raw data can be structured, semi-structured, or unstructured. In a variety of embodiments, structured and semi-structured data include metadata, such as an index or other relationships, describing the data; unstructured data lacks any definitional structure. An interest-driven business intelligence server system can utilize reporting data already created by the interest-driven business intelligence server systems and/or cause new and/or updated reporting data to be generated to satisfy the reporting data requirements. In a variety of embodiments, reporting data requirements are obtained from interest-driven data visualization systems based upon reporting requirements defined by analysts exploring metadata describing raw data stored in the interest-driven business intelligence system.

The data requested in the reporting data requirements can include any of a variety of source data available from an interest-driven business intelligence server system. In a number of embodiments, the raw data, aggregate data, event-oriented data, and/or filtered data is provided to interest-driven business intelligence server systems as source data. In many embodiments, the source data is described by metadata describing the raw data, aggregate data, event-oriented data, and/or filtered data present in the source data. In several embodiments, the source data, aggregate data, event-oriented data, and/or reporting data is stored in a data mart or other aggregate data storage associated with the interest-driven business intelligence server system. Interest-driven business intelligence server systems can load source data into a variety of reporting data structures in accordance with a number of embodiments, including, but not limited to, online analytical processing (OLAP) cubes. In a variety of embodiments, the reporting data structures are defined using reporting data metadata describing a reporting data schema. In a number of embodiments, interest-driven business intelligence server systems are configured to combine requests for one or more OLAP cubes into a single request, thereby reducing the time, storage, and/or processing power utilized by the interest-driven business intelligence system in creating source data utilized to create reporting data schemas and/or the reporting data.

Interest-driven business intelligence server systems can be configured to provide reporting data based on one or more reporting data requirements. Reporting data provided by interest-driven business intelligence server systems includes raw data, aggregate data, event-oriented data, and/or filtered data loaded from raw data storage that has been processed and loaded into a data structure to provide rapid access to the data. Event-oriented data includes sets of data aligned along one or more of the dimensions of (e.g. columns of data within) the sets of data. Sets of data include, but are not limited to, fact tables and dimension tables as appropriate to the requirements of specific applications in accordance with embodiments of the invention. In this way, event-oriented data can include a variety of data across multiple sets of data that are organized by ordering data. Interest-driven business intelligence systems that are configured to utilize event-oriented data that can be utilized in accordance with embodiments of the invention are discussed further in U.S. Patent Publication No. 2015/0081618, titled "Systems and Methods for Interest-Driven Business Intelligence Systems Including Event-Oriented Data" and filed Mar. 5, 2014, the disclosure of which is hereby incorporated by reference in its entirety.

Interest-driven business intelligence systems in accordance with embodiments of the invention can be configured to provide segment data that can be explored using interest-driven data visualization systems. In a variety of embodiments, segment data includes data grouped by one or more pieces of segment grouping data. This segment grouping data can be utilized in the exploration of the segment data to quickly identify patterns of interest within the data. The data utilized within the segment data can be sourced from a variety of pieces of data, including source data, aggregate data, event-oriented data, and reporting data as appropriate to the requirements of specific applications in accordance with embodiments of the invention. Additionally, multiple segments can be combined together in order to explore patterns existing across multiple segments for one or more pieces of reporting data. Based on patterns identified within the (combined) segment data, specific pieces of reporting data can be generated targeting the identified patterns within the segment data. This reporting data can then be utilized to generate detailed reports for additional analysis and exploration of the patterns located within the (combined) segment data. In a variety of embodiments, metadata describing the (combined) segment data can be stored and utilized to generate updated segment data. This updated segment data can be utilized to further analyze patterns occurring within the reporting data as the underlying reporting data changes. Systems and methods that can be utilized to generate and utilize segment data in accordance with embodiments of the invention are disclosed in U.S. Patent Publication No. 2015/0081353, titled "Systems and Methods for Interest-Driven Business Intelligence Systems Including Segment Data" and filed Mar. 5, 2014, the disclosure of which is hereby incorporated by reference in its entirety.

In accordance with embodiments of the invention, an interest-driven business intelligence system can by optimized to improve the performance and/or utilization of resources within the interest-driven business intelligence system. In accordance with some embodiments, an interest-driven business intelligence system may operate in the following manner to resolve fan-in and memory problems during the creation of source data. In many embodiments, the interest-driven server system generates partitioned dictionaries for the source data and replaces each value of the raw data with an integer representation. This allows for easier manipulation of the data during processing. It should be noted, however, than any shorthand (i.e. compressed) representation of the raw data can be utilized as appropriate to the requirements of specific applications of embodiments of the invention. In a number of embodiments, the dictionary data is generated in the following manner. First, the raw data is converted to column data. Each column of the column data is processed by one or more reducer processes. The reducer processes generate a dictionary id (i.e. dictionary identification data) for one or more of the values in the column and determines dictionary information. The partitions are then reviewed to determine whether the partition includes a threshold amount of values. If the partition includes above the threshold amount of values, the partition remains a separate partition. If the partition does not include a threshold amount of information, the partition is combines with other partitions to create larger partitions. In accordance with a variety of embodiments, the dictionary id is replaced with a dictionary id and a partition id. The partition identifier indicates the partition of the dictionary that contains the information and the dictionary identifier indicates the value to found. In accordance with some embodiments, the interest-driven server system determines the value of the spot by determining the partition. The dictionary identifier is then used to obtain the value associated with the dictionary identifier.

In accordance with some embodiments of the invention, the interest-driven server system can optimize the union of datasets including a fact dataset and a dimension dataset in the following manner. When datasets are received, a process is performed on the fact dataset to determine a frequency of items in a key value. The mapper process then uses the frequency values to determine the most frequent values and then send items having the most frequent values to all reducers (i.e. reducer processes executing on one or more computing devices within a distributed computing platform). The mapper processes can also use the frequent items in a corresponding portion of the dimension data to determine the items to send to particular reducers in a round robin manner. The reducers then combine the data and into a new dataset that is the union of the two received datasets.

Systems and methods for interest-driven business intelligence systems in accordance with embodiments of the invention are described below.

Interest-Driven Business Intelligence System Overview

An interest-driven business intelligence system in accordance with an embodiment of the invention is illustrated in FIG. 1. The interest-driven business intelligence system 100 includes a distributed computing platform 110 configured to store raw business data. The distributed computing platform 110 is configured to communicate with an interest-driven business intelligence server system 112 via a network 114. In several embodiments of the invention, the network 114 is a local area network, a wide area network, or the Internet; any network 114 can be utilized as appropriate to the requirements of specific applications in accordance with embodiments of the invention. In a variety of embodiments, the distributed computing platform 110 is a cluster of computing devices configured as a distributed computing platform. The distributed computing platform 110 can be configured to act as a raw data storage system and a data warehouse within the interest-driven business intelligence system. In a number of embodiments, the distributed computing platform includes a distributed file system configured to distribute the data stored within the distributed computing platform 110 across the cluster computing devices. In many embodiments, the distributed data is replicated across the computing devices within the distributed computing platform, thereby providing redundant storage of the data. The distributed computing platform 110 is configured to retrieve data from the computing devices by identifying one or more of the computing devices containing the requested data and retrieving some or all of the data from the computing devices. In a variety of embodiments where portions of a request for data are stored using different computing devices, the distributed computing platform 110 is configured to process the portions of data received from the computing devices in order to build the data obtained in response to the request for data. Any distributed file system, such as the Hadoop Distributed File System (HDFS), can be utilized as appropriate to the requirements of specific applications in accordance with embodiments of the invention. In several embodiments, the interest-driven business intelligence server system 112 is implemented using one or a cluster of computing devices. In a variety of embodiments, alternative distributed processing systems are utilized. Raw data storage is utilized to store raw data, metadata storage is utilized to store data description metadata describing the raw data, and/or report storage is utilized to store previously generated reports including previous reporting data and previous reporting data requirements. Raw data storage, metadata storage, and/or report storage can be a portion of the memory associated with the interest-driven business intelligence server system 112, the distributed computing platform 110, and/or a separate device in accordance with the specific requirements of specific embodiments of the invention.

The interest-driven business intelligence server system 112 is configured to communicate via the network 114 with one or more interest-driven data visualization systems, including, but not limited to, cellular telephones 116, personal computers 118, and presentation devices 120. In many embodiments of the invention, interest-driven data visualization systems include any computing device capable of receiving and/or displaying data. Interest-driven data visualization systems enable users to specify reports including data visualizations that enable the user to explore the raw data stored within the distributed computing platform 110 using reporting data generated by the interest-driven business intelligence server system 112. Reporting data is provided in a variety of forms, including, but not limited to, snowflake schemas and star schemas as appropriate to the requirements of specific applications in accordance with embodiments of the invention. In many embodiments, reporting data is any data that includes fields of data populated using raw data stored within the distributed computing platform 110. The reporting data requested can include aggregate reporting data and/or event-oriented reporting data as appropriate to the requirements of specific applications in accordance with embodiments of the invention.

Based upon received reporting data requirements, the interest-driven business intelligence server system 112 automatically compiles one or more interest-driven data pipelines to create or update reporting data to satisfy the received reporting data requirements. The interest-driven business intelligence server system 112 is configured to compile one or more interest-driven data pipelines configured to create and push down jobs to the distributed computing platform 110 to create source data and then applying various filtering, aggregation, and/or alignment processes to the source data to produce reporting data to be transmitted to interest-driven data visualization systems. In a number of embodiments, an alignment process includes identifying ordering data based on one or more dimensions across a plurality of pieces of source data and creating event-oriented data including data taken from the plurality of pieces of source data aligned (e.g. grouped by or ordered by) according to the ordering data. In a variety of embodiments, the dimensions and the ordering data are stored using event-oriented data metadata describing the structure (e.g. a schema) of the event-oriented data. The fact data corresponding to the event-oriented data can be combined with the event-oriented data metadata in response to the received reporting data requirements as appropriate to the requirements of specific applications in accordance with embodiments of the invention.

In many embodiments, the interest-driven business intelligence server system 112 includes reporting data, source data, event-oriented data, segment data, and/or aggregate data that partially or fully satisfy the reporting data requirements. The interest-driven business intelligence server system 112 is configured to identify the relevant existing reporting data, aggregate data, event-oriented data, segment data, and/or source data and configure an interest-driven data pipeline to create jobs requesting reporting data minimizing the redundancy between the existing data and the new reporting data requirements. In a variety of embodiments, the interest-driven business intelligence server system 112 is configured to determine redundancies between the requested data and existing data using metadata describing the data available from the distributed computing platform 110. In a number of embodiments, the metadata further describes what form the data is available in, such as, but not limited to, aggregate data, filtered data, source data, reporting data, event-oriented data, and segment data. In several embodiments, the interest-driven business intelligence server system 112 obtains a plurality of reporting data requirements and creates jobs using the interest-driven data pipeline to create source data containing data fulfilling the union of the plurality of reporting data requirements. In a variety of embodiments, the interest-driven business intelligence server system 112 is configured to identify redundant data requirements in one or more reporting data requirements and configure an interest-driven data pipeline to create jobs requesting source data fulfilling the redundant data requirements. In several embodiments, the interest-driven business intelligence server system 112 is configured to store aggregate data, event-oriented data, and/or reporting data in a data mart and utilize the stored data to identify the redundant data requirements. In a number of embodiments, the interest-driven business intelligence server system 112 is configured to identify when reporting data requirements request updated data for existing reporting data and/or source data and configure an interest-driven data pipeline to create jobs to retrieve an updated snapshot of the existing reporting data from the distributed computing platform 110.

In several embodiments, jobs pushed down to the distributed computing platform 110 by the interest-driven business intelligence server system 112 cannot be executed in a low-latency fashion. In many embodiments, the distributed computing platform 110 is configured to provide a partial set of source data fulfilling the pushed down job and the interest-driven business intelligence server system 112 is configured to create reporting data using the partial set of source data. As more source data is provided by the distributed computing platform 110, the interest-driven business intelligence server system 112 is configured to update the created reporting data based upon the received source data. In a number of embodiments, the interest-driven business intelligence server system will continue to update the reporting data until a termination condition is reached. Termination conditions can include, but are not limited to, a certain volume of source data is received, the source data provided is no longer within a particular time frame, and an amount of time to provide the source data has elapsed. In a number of embodiments, a time frame and/or the amount of time to provide the source data is determined based upon the time previously measured in the retrieval of source data for similar reporting data requirements.

The interest-driven business intelligence server system 112 is configured to compile an interest-driven data pipeline to create jobs to be pushed down to the distributed computing platform 110 in order to retrieve data. In a variety of embodiments, the jobs created using the interest-driven data pipeline are tailored to the reporting data requirements. In many embodiments, the jobs created using the interest-driven data pipeline are customized to the hardware resources available on the distributed computing platform 110. In a number of embodiments, the jobs are configured to dynamically reallocate the resources available on the distributed computing platform 110 in order to best execute the jobs. In several embodiments, the jobs are created using performance metrics collected based upon the performance of previously executed jobs.

Although a specific architecture for an interest-driven business intelligence system in accordance with an embodiment of the invention is conceptually illustrated in FIG. 1, any of a variety of architectures configured to store large data sets and to automatically build interest-driven data pipelines based upon reporting data requirements can also be utilized. It should be noted that any of the data described herein could be obtained from any system in any manner (i.e. via one or more application programming interfaces (APIs) or web services) and/or provided to any system in any manner as appropriate to the requirements of specific applications of embodiments of the invention.

Interest-Driven Business Intelligence Server Systems

Interest-driven business intelligence server systems in accordance with embodiments of the invention are configured to create jobs to request source data from interest-driven business intelligence systems based upon received reporting data requirements and to create reporting data using the received source data. The reporting data can be aggregate reporting data, event-oriented reporting data, and/or segment data based on the received reporting data requirements. It should be noted that any data derived from the source data can be utilized as reporting data as appropriate to the requirements of specific embodiments of the invention. An interest-driven business intelligence server system in accordance with an embodiment of the invention is conceptually illustrated in FIG. 2. The interest-driven business intelligence server system 200 includes a processor 210 in communication with memory 230. The memory 230 is any form of storage configured to store a variety of data, including, but not limited to, an interest-driven business intelligence application 232, source data 234, aggregate data 236, and event-oriented data 238. The interest-driven business intelligence server system 200 also includes a network interface 220 configured to transmit and receive data over a network connection. In a number of embodiments, the network interface 220 is in communication with the processor 210 and/or the memory 230. In many embodiments, the interest-driven business intelligence application 232, source data 234, aggregate data 236, event-oriented data 238, and/or segment data are stored using an external server system and received by the interest-driven business intelligence server system 200 using the network interface 220. External server systems in accordance with a variety of embodiments include, but are not limited to, distributed computing platforms and data marts. In several embodiments, the aggregate data 236, event-oriented data 238, and/or segment data are stored in a dictionary-encoded format. In a number of embodiments, the data is stored using run length encoding and/or a sparse representation. It should be noted, however, that any encoding format could be utilized as appropriate to the requirements of specific applications in accordance with embodiments of the invention. In a variety of embodiments, the data is stored as parallel arrays of data with each array representing the values of a particular field of data.

The interest-driven business intelligence application 232 configures the processor 210 to perform a variety of interest-driven business intelligence processes. In many embodiments, an interest-driven business intelligence process includes creating jobs using an interest-driven data pipeline to retrieve source data in response to reporting data requirements. The source data can then be utilized to generate aggregate data, event-oriented data, and/or segment data as appropriate to the requirements of specific applications in accordance with embodiments of the invention. In many embodiments, the interest-driven server system generates partitioned dictionaries for the source data and replaces each value of the raw data with an integer representation. This can allow for easier manipulation of the data during processing. Interest-driven business intelligence processes can also optimizing the union of datasets including a fact dataset and a dimension dataset. In several embodiments, when datasets are received, the frequency of items in a key value within a fact dataset is determined. A mapper process within a distributed computing platform can utilize the frequency values to determine the most frequent values and then send items having the most frequent values to all reducer processes within the distributed computing platform.

Figure 2:
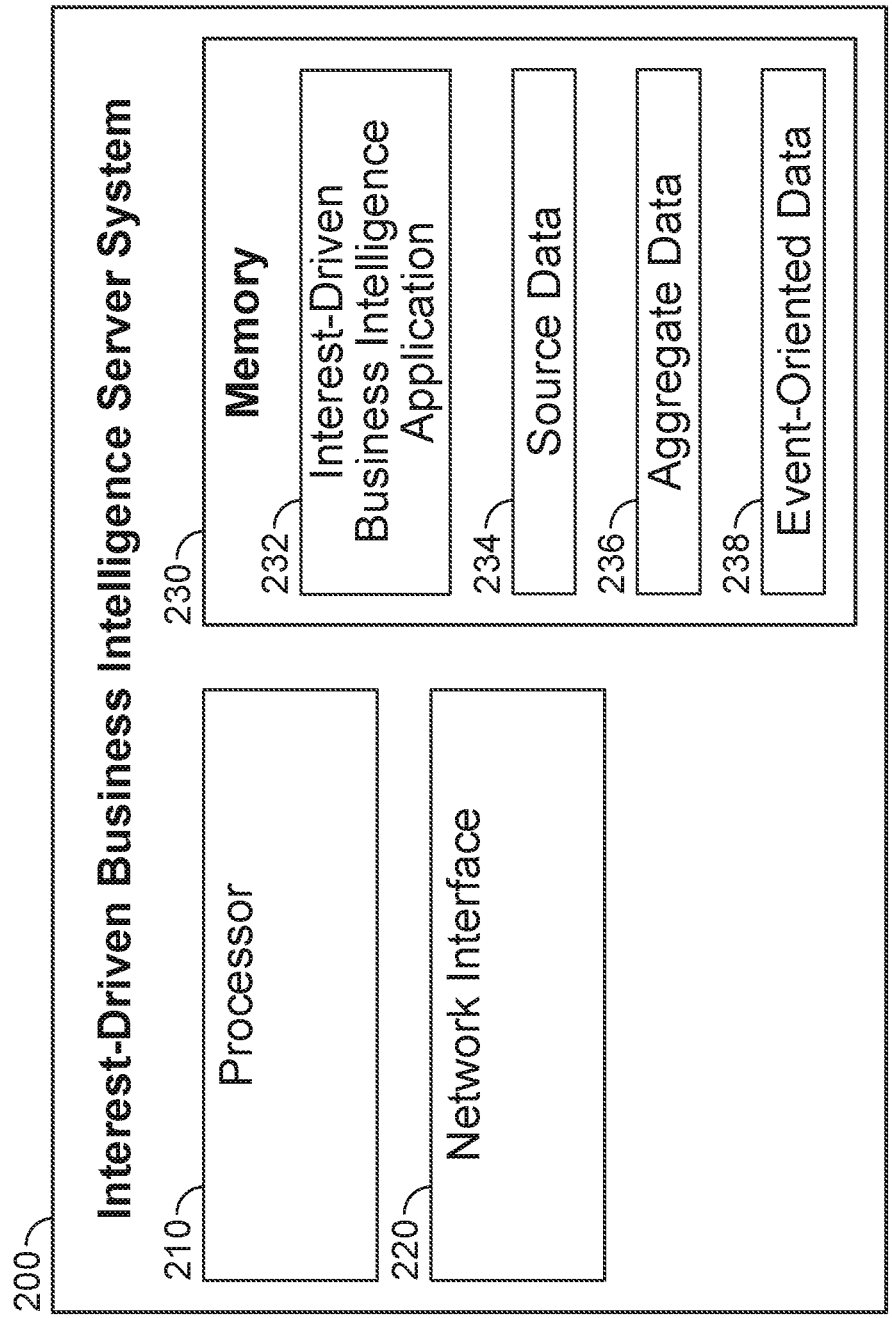
FIG. 2 is a conceptual illustration of an interest-driven business intelligence server system in accordance with an embodiment of the invention.

Although a specific architecture for an interest-driven business intelligence server system in accordance with an embodiment of the invention is conceptually illustrated in FIG. 2, any of a variety of architectures, including those that store data or applications on disk or some other form of storage and are loaded into memory at runtime, can also be utilized. In a variety of embodiments, the memory 220 includes circuitry such as, but not limited to, memory cells constructed using transistors, that are configured to store instructions. Similarly, the processor 210 can include logic gates formed from transistors (or any other device) that are configured to dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Generating Source Data and Metadata

Figure 3:
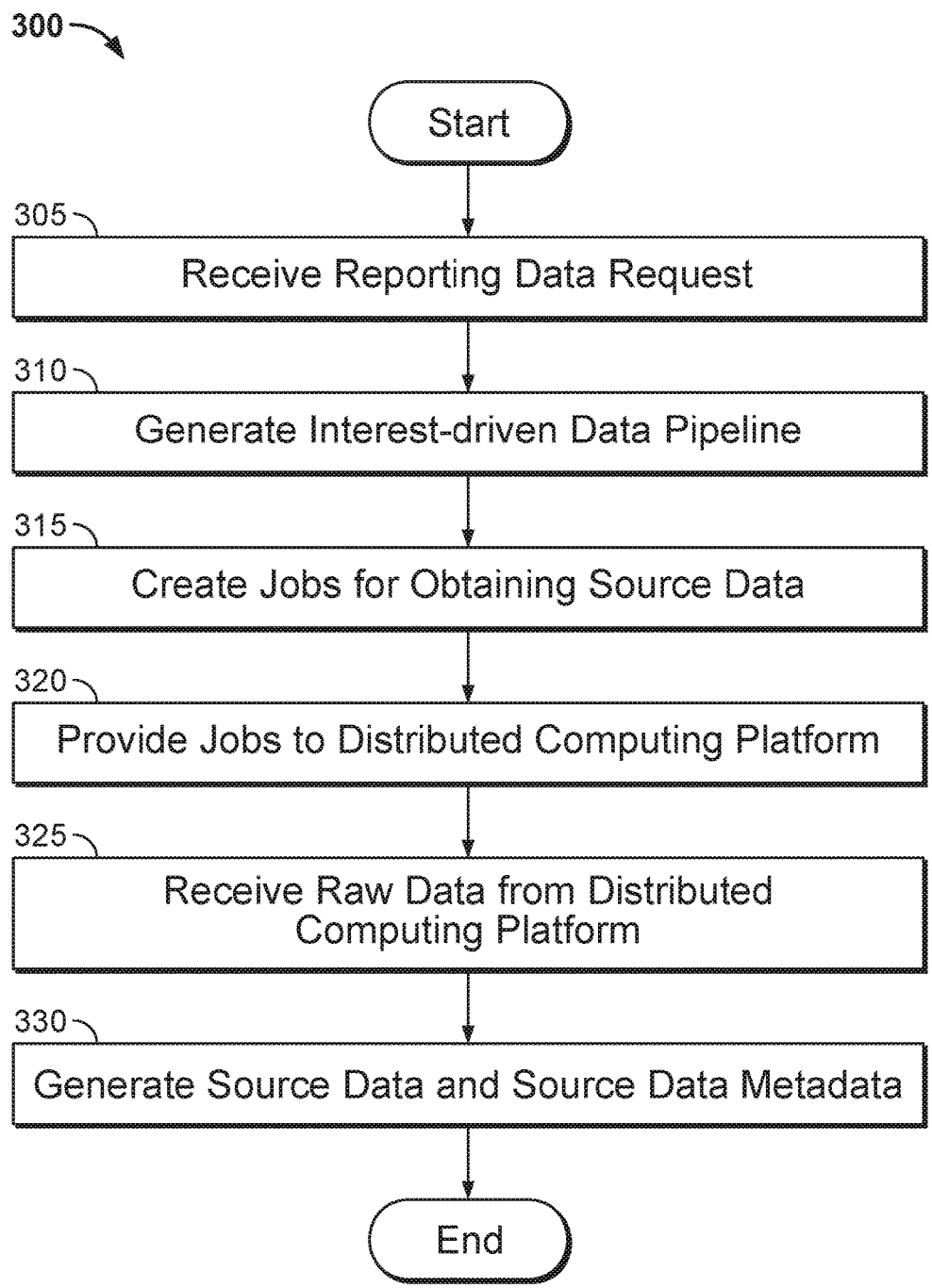
FIG. 3 is a flow chart of a process performed by an interest-driven business intelligence server system to obtain source data in accordance with an embodiment of the invention.

As described above, the interest-driven business intelligence server system creates source data based on reporting data requirements received from an interest-driven business intelligence data visualization system. A process for creating source data in accordance with an embodiment of the invention is shown in FIG. 3. Process 300 begins by receiving reporting data requirements (305). The interest-driven business intelligence server system generates an interest-driven data pipeline based upon the reporting data requirements (310). The interest-driven server system creates jobs for obtaining source data based upon the pipeline (315). The jobs are then sent to distributed computer system for implementation (320). The interest-driven business server system then receives raw data from the distributed computer platform (325). The interest-driven business server system generates the source from raw data (330) and the process ends.

Although a specific process for creating data in an interest-driven business intelligence server system is illustrated in FIG. 3, any of a variety of processes can be utilized in accordance with embodiments of the invention. Processes for optimizing the generation of data in accordance with embodiments of the invention are described in more detail below.

Optimization of Memory

In many embodiments, the interest-driven business intelligence processes can include generating a variety of mapping processes to locate the source data and a variety of reducing processes to retrieve the source data. In a number of embodiments, these mapping and reducing processes are executed using an interest-driven business intelligence server system and/or a distributed computing platform. During the creation of source data, the interest-driven business intelligence server system and/or distributed computing platform can execute a variety of interest-driven business intelligence processes to generate data structures for manipulating the source data. To make manipulation easier, the values in the raw data can be replaced by integers (or any other compressed representation of data) that are easier to manipulate. To do so, the interest-driven business intelligence processes can include generating a dictionary to replace the integer values in the source data with the proper value when needed.

However, it can a problem if the dictionary generation process takes a long time causing the system or a portion thereof to timeout or fail in some other manner. This can occur when there are many discreet values for a dimension in the raw data. In particular, mapping processes used in some embodiments reduce duplicate values and provide data from a single column to a single reducer process. The reducer process generates the dictionary and generates other information including but not limited to sort order for the column. In accordance with some of these embodiments, the provision of data from one column with large cardinality of values in the data to a single reducer process may cause the reducer to run out of memory and/or take an unacceptable amount of time to process. Another problem is that the dictionary must be loaded into the memory of every computing node in the interest-driven business intelligence server system to perform data manipulation. A dictionary for a large set of data (e.g. a million or more values) may be too large for the memory in one or more of the nodes and may cause such a node to crash or fail in some other way when the dictionary is loaded into the memory of the node.

In accordance with some embodiments of the invention, the interest-driven business intelligence server system generates a partitioned dictionary to avoid these and other problems. To replace a value in the data, a node may either read the value from a partition of the partitioned dictionary maintained in a common memory or load the partition containing the required value into memory of the node for use in making the replacement. In accordance with many embodiments, a partition identifier can be added to the dictionary identifier placed in the dataset to identify the partition storing the value. In a number of embodiments, a partition identifier may be maintained separately from a dictionary identifier in the dataset to identify the partition of the dictionary storing the value.

Figure 4:
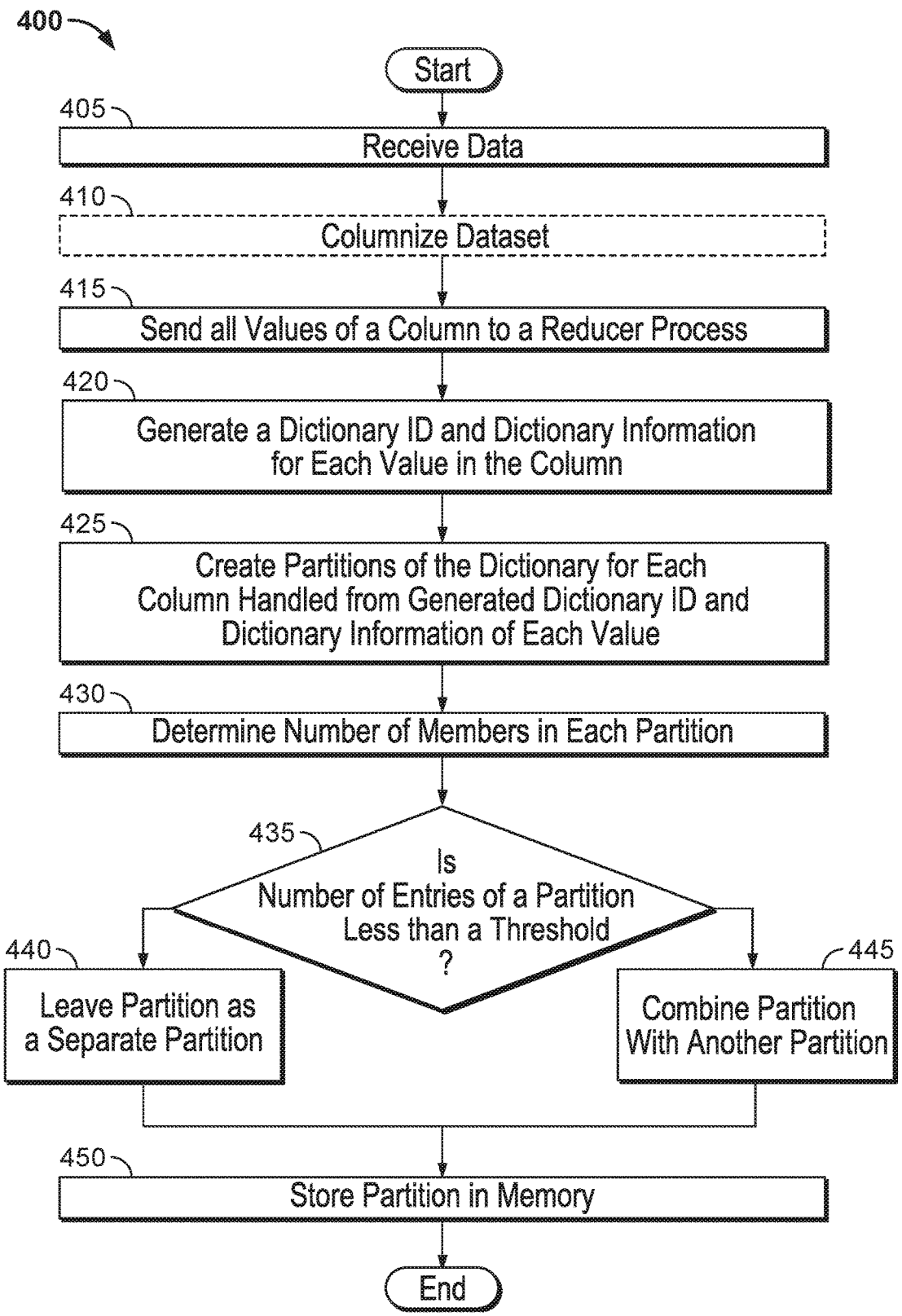
FIG. 4 is a flow chart illustrating a process for generating a dictionary of values in a datastream using an interest-driven business intelligence server system in accordance with an embodiment of the invention in accordance with an embodiment of the invention.

A process for generating dictionary made of partitions in accordance with an embodiment of the invention is shown in FIG. 4. Process 400 begins by receiving the raw data (405). The raw data may then be converted to columns (if needed) (410). A mapping process is then applied to the raw data (415). In accordance with some embodiments, multiple mapping processes may be used. In accordance with many embodiments, each mapping process provides values from a particular column to a particular reducer process. In accordance with a number of embodiments, each mapping process may provide values from a particular column to one or more particular reducer processes. In accordance with some embodiments, each mapper process removes duplicate values read and/or received from the received values and provides the values to the reducer processes.

One more reducer processes receive the values and create dictionary information for each value in the received data (420). In accordance with some embodiments, the dictionary information for each value includes a dictionary identifier, a partition identifier and other information needed to generate partitions of the dictionary. In some embodiments, the dictionary information may further include a column identifier that identifies the column from which the value is received. In accordance with some embodiments, the reducer can also generate a sort order for the values in a particular column, a frequency count of each value, and other information regarding the column of information. Each reducer process then generates a partition of the dictionary for each column of values that the particular reducer handles. In accordance with some embodiments, only those columns with a high cardinality of values will remain an individual partition and the remainder of the values in other columns will be stored in a dictionary. In accordance with some of these embodiments, Very Big Line Feed (VBLF) processes may be used to obtain values from columns that have values stored in the partitions while other values are obtained from the dictionary in a conventional manner. In accordance with a number of embodiments, some operations such as, but not limited to, sorts, rollups, and result construction The process then determines the numbers of values in each partition (430). The number of values in each partition is compared to a threshold value (435). If the number of values in the partition is above the threshold, the partition is stored as an individual partition (440). If the number of partitions is below the threshold, the partition is combined with one or more similar partition(s) to form a new partition (445). In accordance with some embodiments, the process of combining partitions may include reconciling dictionary identifiers for some values. In accordance with some embodiments, each partition formed only includes values from a particular column of values. In accordance with a number of embodiments, a partition may include values from more than one column of data. The combining of partitions may be repeated until all of the partitions contain a number of values that is above the threshold. In accordance with some embodiments, the assigned partition identifiers assigned to a particular value may need to be changed to identify the combined partition that stores the value. In accordance with some other embodiments, the assigned partition identifiers may be used to indicate a new partition that includes the value and the column identifier may be used to search for the value in the new partition. The partitions are then stored in a central memory such as the data warehouse for future use.

Although a specific process for generating a partitioned dictionary in an interest-driven business intelligence server system is illustrated in FIG. 4, any of a variety of processes can be utilized in accordance with embodiments of the invention.

Utilizing Dictionary Identification Data

Figure 5:
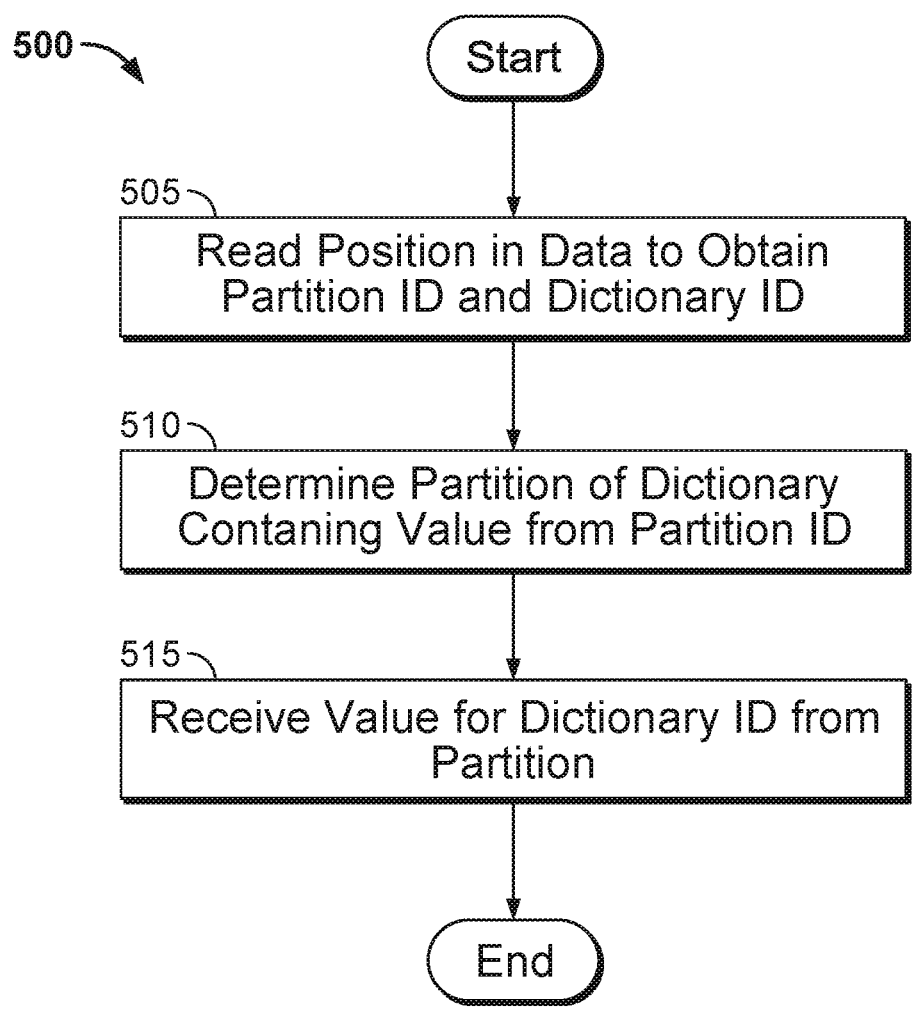
FIG. 5 is a flow chart illustrating a process for obtaining value for a position in a datastream from a partitioned dictionary in an interest-driven business intelligence server system in accordance with an embodiment of the invention.

In order to use the partitioned dictionary, the manner in which a value is obtained from the dictionary by some or all operations performed by a node may be changed in accordance with some embodiments of the invention. A process from obtaining a value from a partitioned dictionary in accordance with an embodiment of the invention is shown in FIG. 5. In process 500, an operation performed by a node needs to retrieve a value from the dictionary. The operation reads the partition identifier and dictionary identifier for the value (505). In accordance with some embodiments, a column identifier or some other secondary identifier may also be read for use in locating the dictionary identifier in a particular partition. The partition storing the reference between the value and the dictionary identifier is identified based on the partition identifier (510). The value is then determined from the dictionary identifier (515). In accordance with some embodiments, a secondary identifier such as, but not limited to, a column identifier may be used to locate the dictionary identifier within the partition.

Although a specific process for obtaining a value from a portioned dictionary in an interest-driven business intelligence server system is illustrated in FIG. 5, any of a variety of processes can be utilized in accordance with embodiments of the invention.

Skew Handling Process in Processes Using Map-Reduce Programming

In accordance with some embodiments of the invention, a Map-Reduce programming model is used to perform operations. A Map-Reduce programming model makes large-scale data processing parallelizable across large datasets. One of the key elements in a Map-Reduce programming model is a re-distribution of data to different nodes in a system such that all of the belonging to one key can be processed on the same node. An example of an operation that use a Map-Reduce programming model in accordance with the present invention is a join operation. In a join operation, a new dataset or table is created from two datasets or tables that have at least one common key between the datasets or tables. In accordance with some embodiments, skewing is a problem in operations using a Map-Reduce programming model. An example of skewing in accordance with an embodiment of the invention performing a join operation is shown in FIG. 6.

Figure 6:
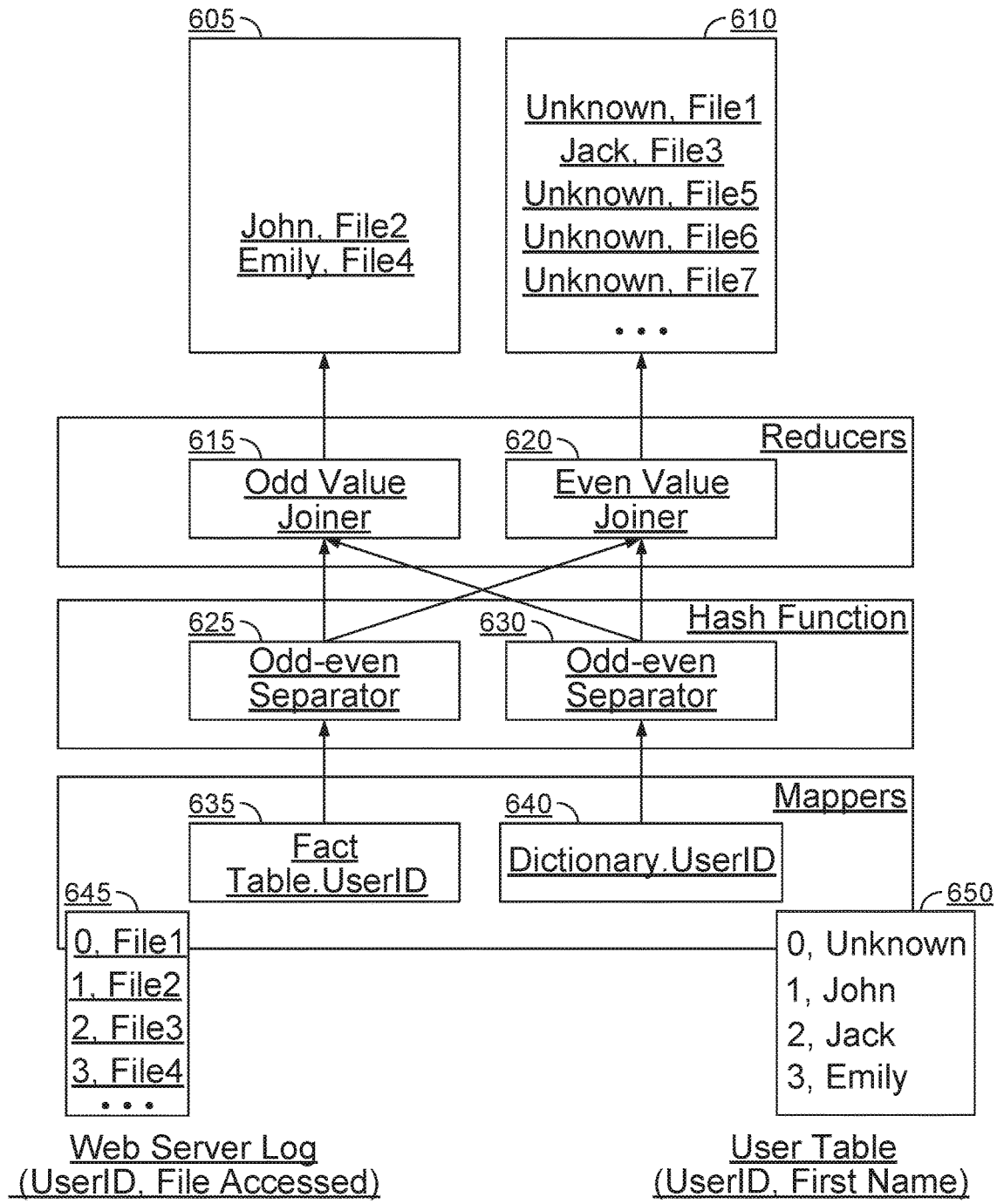
FIG. 6 is a conceptual diagram of mapping processes and reducer process used by an interest-driven business intelligence server system to perform a join operation in accordance with an embodiment of the invention.

The join operation in FIG. 6 is joining web server log dataset represented by table 645 of user identification and a file accessed and a user dataset represented by table 650. Mapping process 635 and 640 respectively provide individual pieces of data in the tables and use a hash function to provide data with the proper common key to a proper reducer process 615 and 620. In FIG. 6, the key is the user identification. The hash function, odd-even separators 625 and 630, separate the data related to each key in the particular tables 645 and 650 based on whether the user identification is an odd or an even value. In FIG. 6, the data associated with an odd value user identification in each dataset is sent to reducer process 615 and the data associated with an even value user identification in each dataset is sent to reducer process 620. The reducer processes then merge the data from the new datasets into new data 605 and 610. New data 605 includes the information associated with the user identifications having odd values and new data 610 includes the information associated with user identifications having even values. As can be seen from new data 605 and 610 user identification 0 occurs more often than any other identification. As such, reducer process 620 must handle many more pieces of data than reducer 615. Such an overload of one reducer process is an example of skewing. In very large datasets that may occur to such a point that a node providing the reducer process handling the skewed value may take an unacceptable amount of time to process the data and/or run out of memory in forming the new data.

Figure 7:
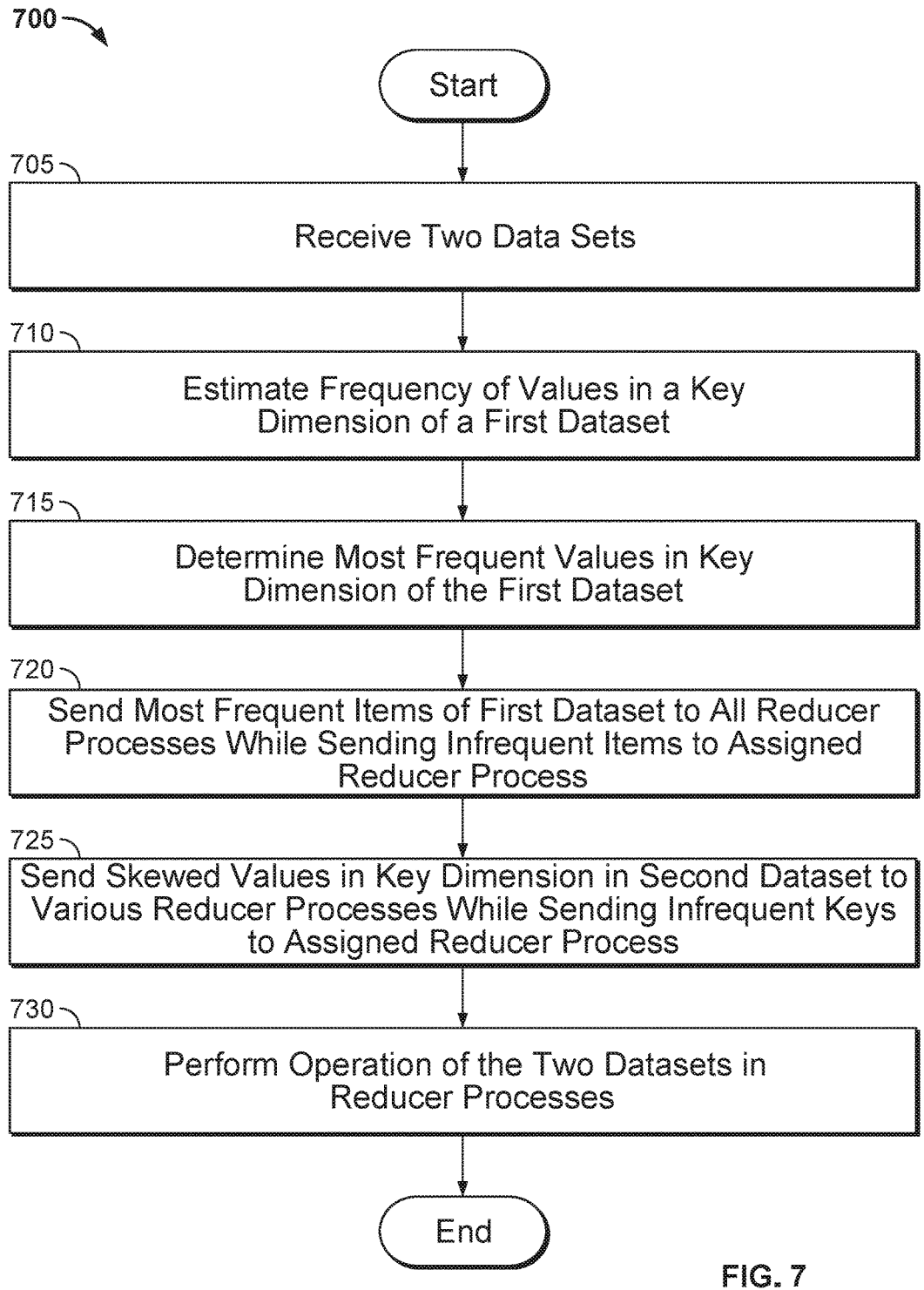
FIG. 7 is a flow chart illustrating a process for performing an operation that use a Map-Reduce programming model using an interest-driven business intelligence server system in accordance with an embodiment of the invention.

To overcome the problem of skewing of values, interest-driven business intelligence server systems provides a mapping processes that more evenly distributes the values to all of the reducers to reduce the computational load on the reducer process handling the skewed value and more effectively use the processing power of those nodes that are not handling the skewed nodes. To do so, interest-driven business server systems in accordance with embodiments of the invention must perform a process that identifies skewed values in the key data and then distribute data associated with the skewed values to all of the reducer processes. The mappers must then also provide the information for the skewed value in the other dataset to all of the reducer processes to allow the new data to be formed. A process for handling skewed values in a join operation using a Map-Reduce programming model in accordance with an embodiment of the invention is shown in FIG. 7. One skilled in the art will note that a similar process may be used for any operation using a Map-Reduce programming model in accordance with various embodiments of this invention.

In a process 700, two datasets are received (705). The two datasets share a common key or dimension that maybe used to join data in the two datasets. In accordance with a number of embodiments, each data stream is received by a separate set of one or more mapping processes. The process 700 estimates the frequency of values in the common key or dimension in a first one of the received datasets (710) and determines the most frequently occurring values in the common key or dimension (715). For example, in accordance of an embodiment of the invention where the user access table is being joined with a user fact table in which a user identification is the common key, the frequency of values, as well as the most frequently occurring values, of the user identifications in the user access table is determined. In accordance with some embodiments, a one-pass algorithm, such as the Space-Saving algorithm and/or the CountSketch algorithm, which estimates the most frequently occurring values in the data stream is used. In a variety of embodiments, the one-pass algorithm finds the most popular elements (a fixed and/or dynamically determined number) along with locating elements that frequently occur in the data stream, i.e. the joined tables. In several embodiments, the most popular elements are the pieces of data occurring with the highest frequency based on the parameter of a distribution of the occurrences of the pieces of data. The one-pass algorithm only maintains the estimated frequencies in accordance with many embodiments. As such, the algorithm does not require a large amount of memory. In accordance with a number of embodiments, the algorithm is performed by each mapping process. The results of all of the mapping processes are aggregated to determine the most frequently occurring values.

Each mapping processing that receives data from the first one of the received datasets broadcast data that includes the most frequent values of the key dimension to all reducer processes (720). Data including other values for the key are sent to the set of one or more reducers assigned to handle the values. The data from the second data set that includes the most frequent key values are sent to the various reducer processes from the mapping processes handling the second dataset in a round robin fashion (725). In many embodiments, the round robin process includes assigning data to available processing units (i.e. reducer processors) without any priority. In a variety of embodiments, a priority order is utilized for one or more of the reducer processors. Additionally, the round robin processes can include assigning data equally to the reducer processors and/or based on the characteristics (such as available processing power) of the reducer processors. The data can be assigned in any order as appropriate to the requirements of specific applications of embodiments of the invention, including randomly and in circular order. The reducer processes then perform the operation on the data from the two datasets (730). For example, the data from the two datasets that include the same key value may be joined in a join operation to form a new dataset or table in accordance with an embodiment of the invention.

Although a specific process for performing an operation using a Map Reduce programming model in an interest-driven business intelligence server system is illustrated in FIGS. 6 and 7, any of a variety of processes and models can be utilized in accordance with embodiments of the invention.

Although the present invention has been described in certain specific aspects, many additional modifications and variations would be apparent to those skilled in the art. In particular, any of the various processes described above can be performed in alternative sequences and/or in parallel (on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A system comprising:
    at least two processors; and
    a memory storing an application wherein the application directs the at least two processors to:
        receive raw data that has a plurality of dimensions;
        generate one or more partitions of a dictionary for each dimension of the plurality of dimensions of the raw data, wherein each of the one or more partitions includes an entry for at least one dimension of the plurality of dimensions, wherein the entry at least includes a corresponding dictionary identifier and a corresponding value;
        determine a number of entries in each of the one or more partitions;
        determine whether the number of entries in a partition of the one or more partitions is greater than a threshold value;
        in the event the number of entries for the partition of the one or more partitions is greater than the threshold value, store the partition in a common memory;
        in the event the number of entries for the partition of the one or more partitions is not greater than the threshold number:
            combine the partition with another partition having the number of entries less than the threshold value into a single partition in which the number of entries is greater than the threshold value; and
            store the single partition in the common memory.

2. The system of claim 1, wherein each dimension of the plurality of dimensions is a column of the raw data.

3. The system of claim 2, wherein the application further directs the at least two processors to columnize the raw data.

4. The system of claim 1, wherein:
    the application further directs the at least two processors to provide at least one mapping process and at least one reducer process
    wherein the at least one mapping process receives a value from a particular dimension of the raw data and provides the value to one of the at least one reducer process, wherein the at least one reducer process is configured to generate the one or more partitions of the dictionary for the particular dimension,
    wherein the at least one reducer process generates a particular partition of the dictionary for each dimension of the plurality of dimensions for which the value is received by the at least one reducer.

5. The system of claim 1, wherein the application further directs the at least two processors to replace a value in the raw data with a partition identifier and a dictionary identifier.

6. The system of claim 1, wherein the application further directs the at least two processors to change a partition identifier of a value in response to combining one or more partitions.

7. The system of claim 1, wherein the application further directs the at least two processors to reconcile dictionary identifiers for values in combined partitions in response to combining two or more partitions.

8. The system of claim 1, wherein the application further directs the at least two processors to:
    receive a request to obtain a value;
    read position in data to obtain a partition identifier and dictionary identifier of the value; and
    obtain the value from a partition of the dictionary identified by the partition identifier using the dictionary identifier.

9. The system of claim 8, wherein the obtaining of the value includes loading the partition identified by the partition identifier into the memory associated with one of the at least two processors.

10. The system of claim 1, wherein the application further directs the at least two processors to read a column identifier from the position in the data and to use a dictionary identifier and the column identifier to obtain a value from the partition.

11. The system of claim 1, wherein each of the one or more partitions includes a corresponding partition identifier, wherein the application further directs the at least two processors to retrieve the value from the dictionary at least in part by:
    reading a partition identifier associated with one of the one or more partitions;
    determining the one of the one or more partitions to be storing the value based on the partition identifier; and
    determining the value based on the dictionary identifier stored in one of the entries of the one of the one or more partitions.

12. A method, comprising:
    receiving raw data that has a plurality of dimensions;
    generating, by a processor, one or more partitions of a dictionary for each dimension of the plurality of dimensions of the raw data, wherein each of the one or more partitions includes an entry for at least one dimension of the plurality of dimensions, wherein entry at least includes a dictionary identifier and a value;
    determining, by the processor, a number of entries in each of the one or more partitions;
    determining, by the processor whether the number of entries in a partition of the one or more partitions is greater than a threshold value;
    in the event the number of entries for the partition of the one or more partitions is greater than the threshold value, storing the partition in a common memory;
    in the event the number of entries for the partition of the one or more partitions is not greater than the threshold value:
        combining the partition with another partition having the number of entries less than the threshold value into a single partition in which the number of entries is greater than the threshold value; and
        storing the single partition in the common memory.

13. The method of claim 12, wherein each dimension of the plurality of dimensions is a column of the raw data.

14. The method of claim 13, further comprising columnizing the raw data.

15. The method of claim 12, further comprising providing at least one mapping process and at least one reducer process, wherein:
the at least one mapping process receives a value from a particular dimension of the raw data and provides the value to one of the at least one reducer process, wherein the at least one reducer process is configured to generate the one or more partitions of the dictionary for the particular dimension,
wherein the at least one reducer process generates a particular partition of the dictionary for each dimension of the plurality of dimensions for which the value is received by the at least one reducer.

16. The method of claim 12, further comprising replacing a value in the raw data with a partition identifier and a dictionary identifier.

17. The method of claim 12, further comprising changing the partition identifier of a value in response to combining one or more partitions.

18. The method of claim 12, further comprising reconciling dictionary identifiers for values in combined partitions in response to combining two or more partitions.

19. The method of claim 12, further comprising:
receiving a request to obtain a value;
reading a position in the data to obtain a partition identifier and dictionary identifier of the value; and
obtaining the value from a partition of the dictionary identified by the partition identifier based upon the dictionary identifier.

20. The method of claim 19, wherein the obtaining of the value includes loading the partition identified by the partition identifier into a memory.

21. A computer program product, the computer program product being embodied in a non-transitory computer readable storage medium and comprising computer instructions for:
receiving raw data that has a plurality of dimensions;
generating one or more partitions of a dictionary for each dimension of the plurality of dimensions of the raw data, wherein each of the one or more partitions includes an entry for at least one dimension of the plurality of dimensions, wherein the entry at least includes a dictionary identifier and a value;
determining a number of entries in each of the one or more partitions;
determining whether the number of entries in a partition of the one or more partitions is greater than a threshold value;
in the event the number of entries for the partition of the one or more partitions is greater than the threshold value, storing the partition in a common memory; and
in the event the number of entries for the partition of the one or more partitions is not greater than the threshold value:
combining the partition with another partition having the number of entries less than the threshold value into a single partition in which the number of entries is greater than the threshold value; and
storing the single partition in the common memory.

* * * * *